United States Patent [19]
Möltgen

[11] 4,019,124
[45] Apr. 19, 1977

[54] APPARATUS FOR COMPENSATING REACTIVE POWER IN A THREE-PHASE NETWORK

[75] Inventor: Gottfried Möltgen, Erlangen, Germany

[73] Assignee: Siemens Aktiengesellschaft, Munich, Germany

[22] Filed: Mar. 11, 1976

[21] Appl. No.: 665,876

[30] Foreign Application Priority Data

Mar. 25, 1975  Germany .................. 2513168

[52] U.S. Cl. .................. 323/102; 323/119
[51] Int. Cl.² .................. H02J 3/18
[58] Field of Search .................. 321/5, 9 A, 27 R; 323/101, 102, 106, 108, 109, 110, 111, 112, 119, 124, 127, 128

[56] References Cited

UNITED STATES PATENTS

| | | | |
|---|---|---|---|
| 3,740,638 | 6/1973 | Thorborg | 323/119 X |
| 3,781,635 | 12/1973 | Sauer | 321/27 R |
| 3,900,792 | 8/1975 | Möltgen | 323/119 X |
| 3,932,799 | 1/1976 | Frank et al. | 323/128 X |

*Primary Examiner*—A. D. Pellinen
*Attorney, Agent, or Firm*—Kenyon & Kenyon Reilly Carr & Chapin

[57] ABSTRACT

An apparatus for compensating for the reactive power in a three-phase network. The apparatus includes an uncontrolled rectifier, an intermediate DC link connected to the rectifier, and a self-commutating inverter connected to the DC link and controlled so as to have a pulse-width modulated output.

3 Claims, 10 Drawing Figures

APPARATUS FOR COMPENSATING REACTIVE POWER IN A THREE-PHASE NETWORK

BACKGROUND OF THE INVENTION

1. Field of the Invention

The invention relates to apparatus for compensating for the reactive power in a three-phase network and, in particular, to a cycloconverter for providing such compensation.

2. Description of the Prior Art

A line-commutated, short-circuited converter with valve branches that can be fired and extinguished can operate as an inductive reactive load with a firing delay of approximately +90° and as a capacitive reactive load with its firing instant advanced approximately −90°. In the latter converter when switching from inductive to capacitive reactive load operation and vice versa, the entire range of firing angles between the two extreme firing angles mentioned has to be traversed. This, however, is not possible in short-circuit operation, so that the arrangement does not constitute a universal reactive-load converter.

It is an object of the present invention to create a universally usable apparatus which can compensate for reactive power and which can be rapidly and continuously changed from compensating for inductive power to compensating for capacitive power, and vice versa.

SUMMARY OF THE INVENTION

The above and other objects are accomplished in accordance with the principles of the present invention by a cycloconverter apparatus which comprises: an uncontrolled rectifier connected to the network for generating an impressed DC voltage; an intermediate DC link with a smoothing choke and a capacitor; and a self-commutating inverter, the output of which is coupled, via inductances, to the network and is a pulse-width modulation signal having a fundamental frequency component which, when coupled to the network, is in phase-opposition to the network voltage and which has an amplitude which can be varied by influencing the pulse width angle.

More specifically, the self-commutating inverter is controlled such that the aforesaid amplitude of the fundamental of its pulse-width modulation signal can be set larger or smaller than the amplitude of the network voltage. The apparatus of the invention thus acts either as a capacitive or an inductive reactive load, depending on the vector position of the currents which are driven by the difference of the fundamentals of the inverter and network output voltages. Also, the transition between capacitive and inductive reactive load and vice versa can be continuous. It is particularly advantageous that the apparatus operates from the network without consuming active power, except for unavoidable losses in the components and connecting lines. These unavoidable losses, in turn, are compensated for by the rectifier.

Additionally, since the inverter is controlled such that its output is a pulse-width modulated signal, the rectifier can be uncontrolled.

BRIEF DESCRIPTION OF THE DRAWINGS

The above and other features and aspects of the present invention will become apparent upon reading the following detailed description in conjunction with the accompanying drawings, in which.

DETAILED DESCRIPTION

Figure 1:
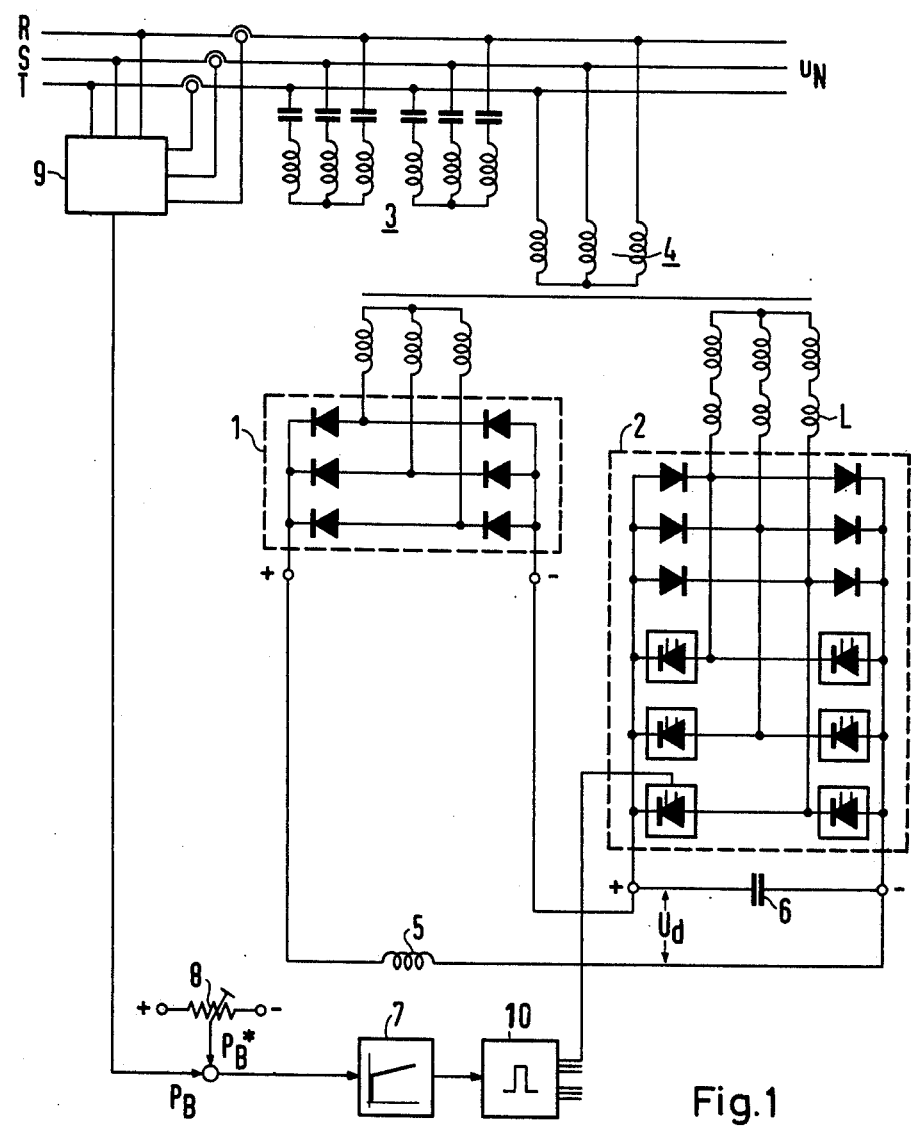
FIG. 1 shows an apparatus in accordance with the principles of the present invention.

FIG. 1 shows an apparatus for compensating for the reactive power in a three-phase network R, S, T with the line voltage $u_N$ in accordance with the principles of the present invention. As illustrated, the apparatus includes a capacitor installation 3 which may include, for example, filter circuits for filtering out fifth and seventh harmonic components. The capacitor installation 3 is designed to compensate for an average value of the reactive power. The reactive power fluctuations above such average are, in turn, coupled to a converter arrangement which is connected to the line via a converter transformer 4. The converter arrangement comprises an uncontrolled rectifier 1, a self-commutating inverter 2, and an intermediate DC link including a smoothing choke 5 and a capacitor 6, across which appears the DC voltage $U_d$. The output of the inverter 2 is connected, via inductances L and the converter transformer 4, to the three-phase network.

The inverter 2 is controlled by a control unit 10 in accordance with a pulse-width modulation method, which will be explained in detail hereinbelow with reference to FIGS. 2a–2d and 3a–3e. To avoid overcomplicating the drawing, only one output of the control unit 10 leading to a control input of a controlled valve branch of the inverter 2, is shown. The control unit 10 is, in turn, controlled by the output signal of a controller 7. The controller 7 is fed on its input side a difference signal which is formed by taking the difference of a reference reactive power value $P_B^*$ derived from a reference-value setter 8 and the actual reactive power value $P_B$ from an acquisition stage 9 for monitoring the reactive power of the three-phase network R, S, T. The reference reactive power value $P_B^*$ is preferably set by the reference value setter 8 at a zero value.

Figure 2A:
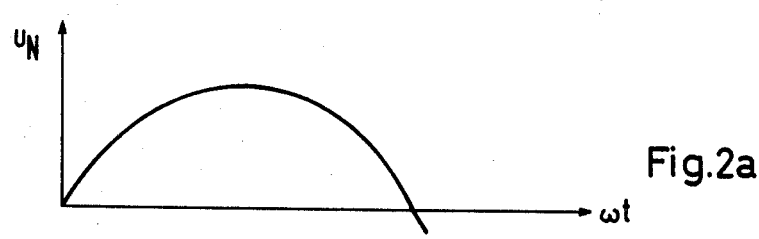
FIGS. 2a–2d illustrates waveform diagrams for some of the voltages present in the apparatus of FIG. 1.

The operation of the apparatus of FIG. 1 will be explained by making reference to FIG. 2a to 2d. In these figures a pulse frequency is used which is six times the frequency of the line voltage $u_N$, a half-wave of one period of which is shown in FIG. 2a.

Figure 2B:
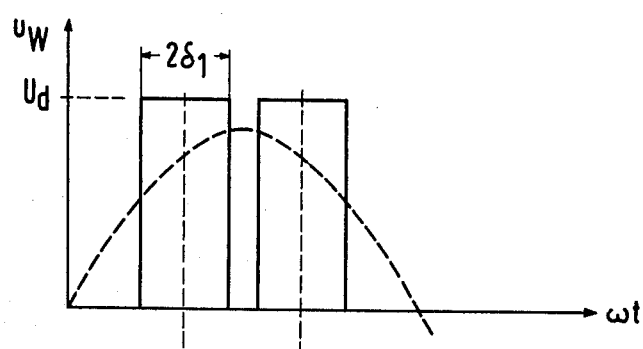

FIG. 2b shows the output voltage $u_W$ of the inverter 2, when the overall converter apparatus of FIG. 1 is acting as a capacitive reactive load. As can be seen, within each one half-wave of the line voltage $u_N$, the output voltage of the inverter has two voltage pulses, the pulse width angle of which is designated as $2\delta_1$ and the amplitude of which is designated as $U_d$. The aforesaid pulse output can be resolved into fundamental and harmonic components. The fundamental component is shown in dashed lines in FIG. 2b. As indicated, its amplitude is larger than the amplitude of the line voltage. The difference of the two voltages results, via the inductances L, in currents which act as a capacitive reactive load for the three-phase network.

Figure 2C:
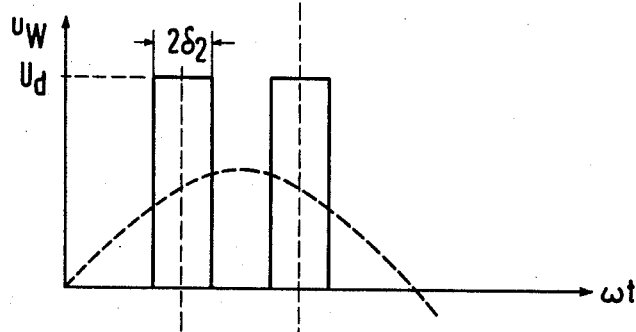

FIG. 2c shows output voltage pulses for the inverter 2 whose pulse width angle $2\delta_2$ is smaller than the pulse width angle $2\delta_1$. These pulses result in a fundamental component whose amplitude is equal to the amplitude of the line voltage. Therefore, in this case, the overall apparatus of FIG. 1 operates with a reactive power of zero, as the difference of the line and inverter voltages does not result in current in the inductances L.

Figure 2D:
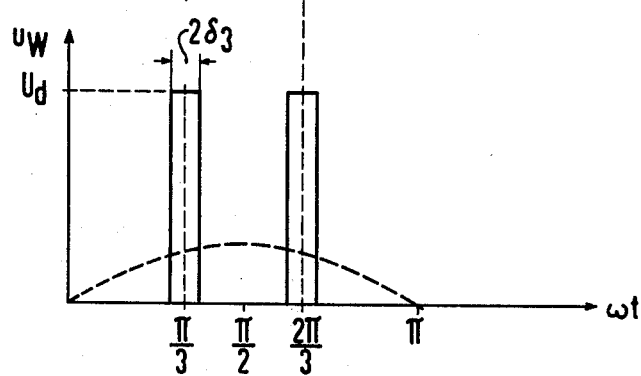

In FIG. 2d, the pulse width angle of the pulses of inverter 2 has been further reduced to a value $2\delta_3$. The amplitude of the fundamental component associated with the pulses is now smaller than the amplitude of the line voltage. In this case, therefore, the converter arrangement operates as an inductive reactive load.

As can be appreciated, in the above-described modulation of the pulses of the inverter 2, only the pulse width angle $2\delta$ is changed. This type of pulse modulation results only in harmonics of fifth, seventh, 11th 13th order, etc. in the line current of the three-phase network. These harmonics, in turn, are short-circuited by the filter circuits 3, so that they cannot flow into the network.

Figure 3A:
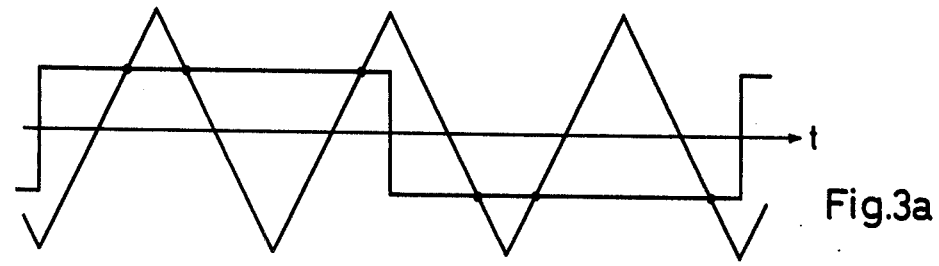
FIGS. 3a–3e shows waveform diagrams for generating the pulse-width modulated voltage present in the apparatus of FIG. 1.
Figure 3B:
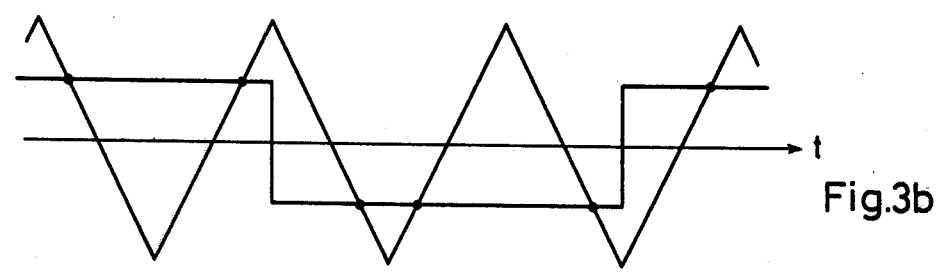
Figure 3C:
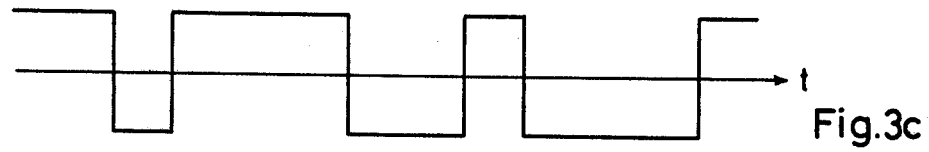
Figure 3D:
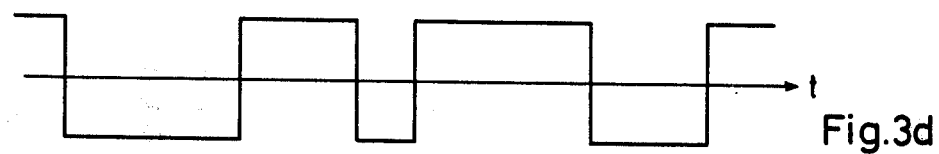
Figure 3E:
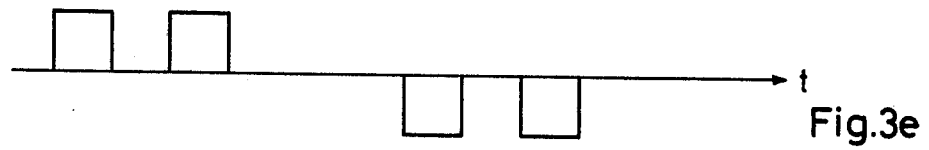

FIGS. 3a–3e show a possible technique for realizing the above-described pulse width modulation of the inverters. In FIG. 3a and 3b, two phase-opposed, symmetrical triangular voltages are shown, the frequency of each of which is three times the frequency of the line voltage. The two triangular voltages are compared with square-wave reference voltages, which are mutually shifted in phase. From the intersections of the triangular voltages with the square-wave voltages, the signals shown in FIGS. 3c and 3d are obtained for controlling the inverter. The output voltage of the inverter 2 controlled in this manner is shown in FIG. 3e. As can be seen from the latter figure, the inverter output includes two pulses of equal duration in each half-wave of the line voltage. By varying the magnitude of the square-wave voltages, the pulse width angle of these pulses can be varied.

It should be noted that the capacitor 6 is provided in the DC link to ensure that an impressed DC voltage $U_d$ is present at the inverter 2. In installations of larger power rating, several parallel-connected inverters which are decoupled from the line by converter transformers, may be connected to one capacitor. In all, twelve-pulse type arrangements may be employed.

The magnitude of the impressed DC voltage $U_d$ is chosen as a function of the desired ratio of the capacitive to the inductive reactive power. If, for example, the same values are required for the inductive and the capacitive reactive power, the magnitude of the DC voltage should be about twice the peak value of the line voltage.

In the apparatus of FIG. 1, economic considerations limit the pulse frequency of the self-commutating inverter 2 to a few hundred Hz. Preferably, as has been indicated in the illustrated case, a pulse frequency should be employed which corresponds to six times the line frequency, i.e., a pulse frequency of 300 Hz for operation with a 50-Hz network. Additionally, the voltage pluses of the inverter output should be symmetrically located at distances of $\pm\pi/3$ from the zero crossings of the fundamental of the pulses, as is also indicated in the illustrated case.

What is claimed is:

1. A cycloconverter apparatus for compensating for the reactive power in a three-phase network comprising:
   an uncontrolled converter adapted to be connected to said network for generating an impressed DC voltage;
   a self-commutating inverter for producing an output signal;
   inductance means for coupling said output signal to said network;
   an intermediate DC link for coupling said impressed voltage to said inverter;
   and means for controlling said inverter such that said output signal is a pulse width modulation signal having a pulse width angle which can be varied, said pulse width modulation signal comprising a fundamental frequency component which when coupled by said inductances is in phase opposition to the network voltage and which has an amplitude which varies with variations in said pulse width angle.

2. Apparatus in accordance with claim 1 in which:
   the pulse frequency of said pulse modulation signal is six times the frequency of said network voltage; and
   the voltage pulses of said pulse modulation signal have a fixed predetermined magnitude and are centered at distances of $\pm\pi/3$ from the zero crossings of said fundamental component.

3. Apparatus in accordance with claim 2 in which said means for controlling includes:
   a controller responsive to the difference between a reactive power reference value and the actual reactive power value of said network.

* * * * *